Aug. 4, 1936.　　　　S. W. JOLLEY　　　　2,049,652
STEAM POWER PLANT GENERATOR
Filed Nov. 15, 1934　　　3 Sheets—Sheet 1
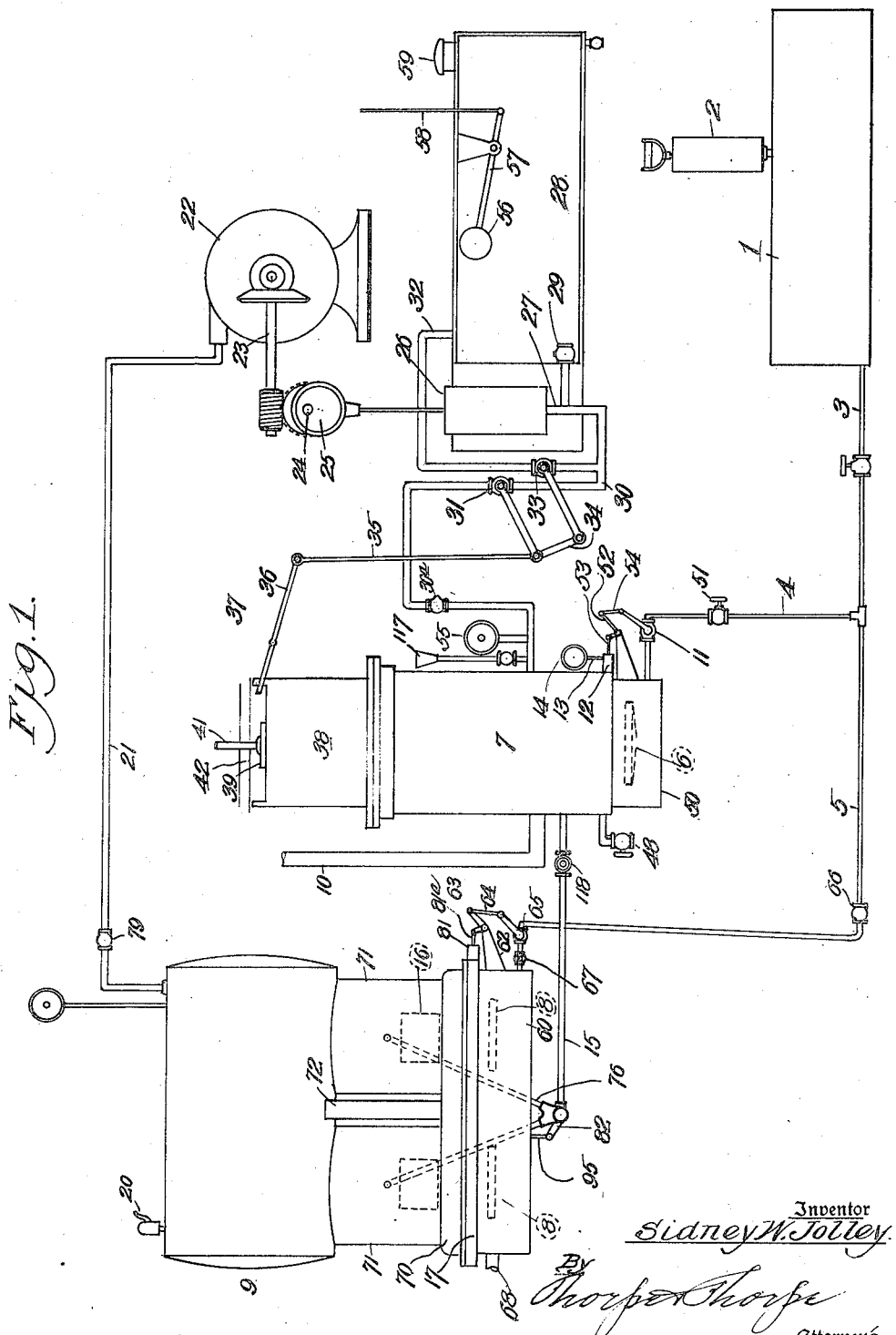

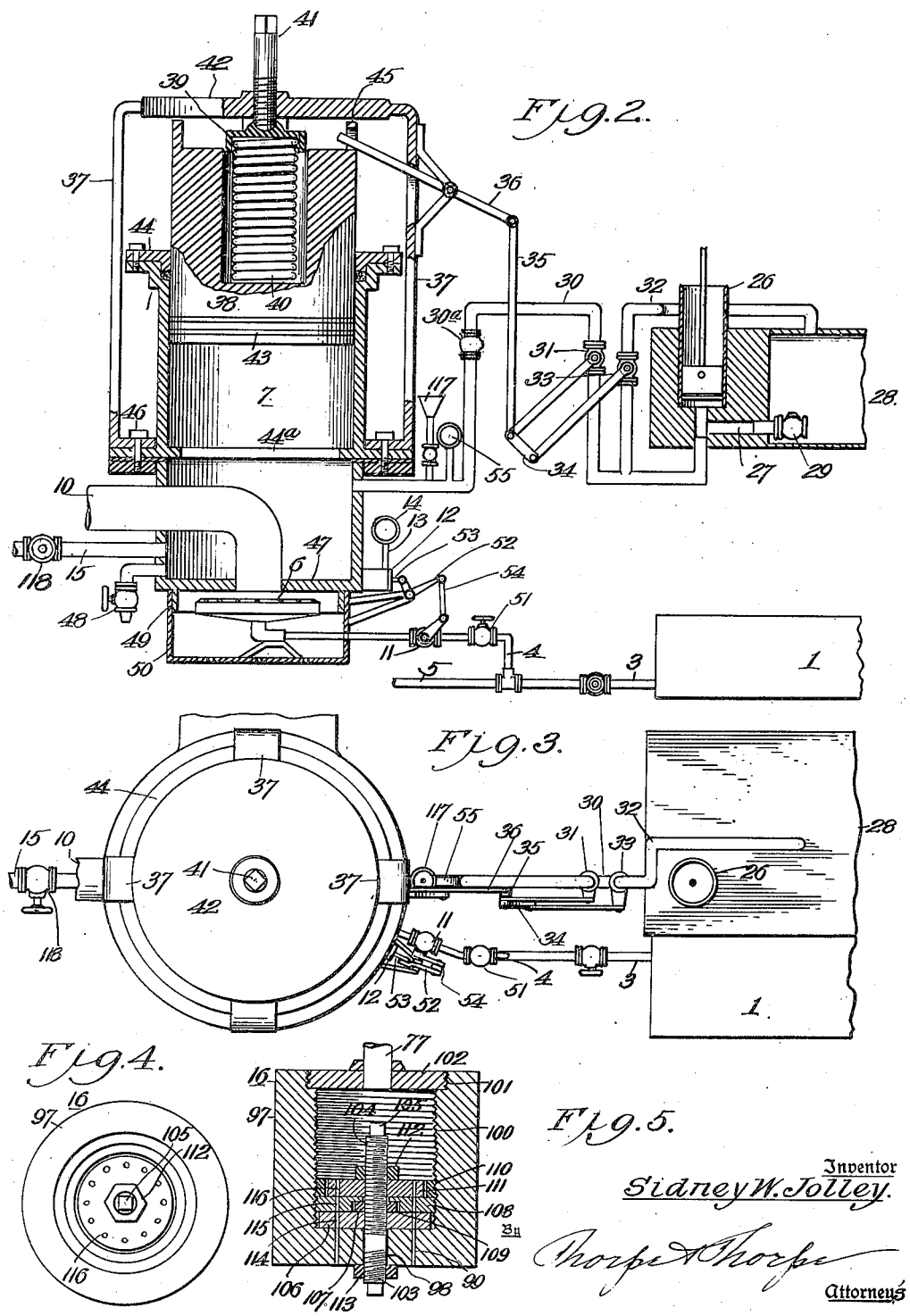

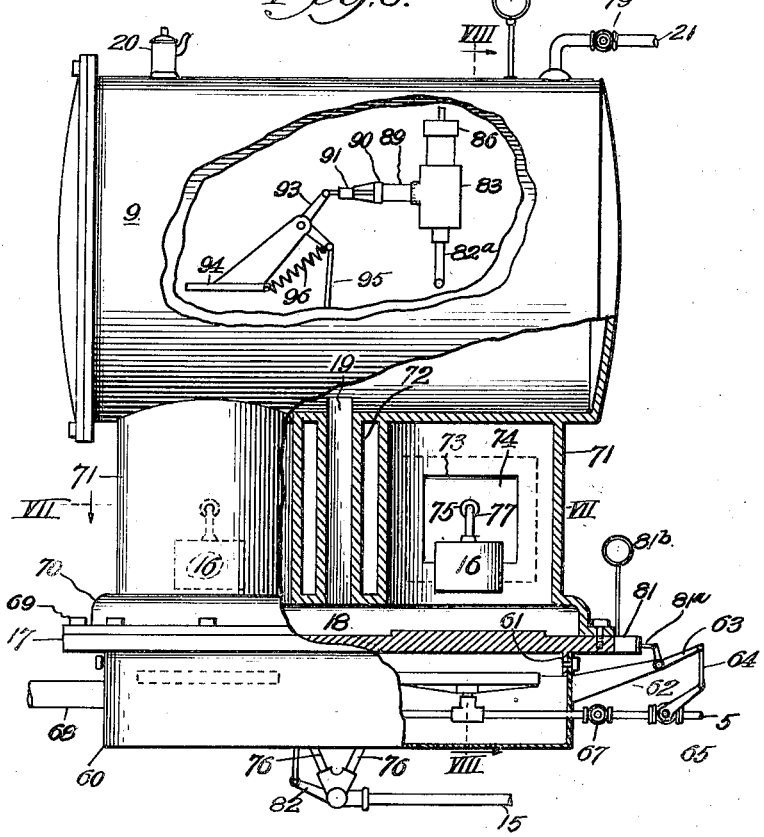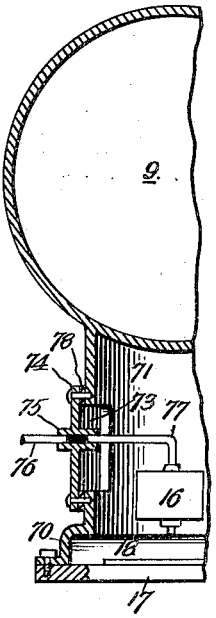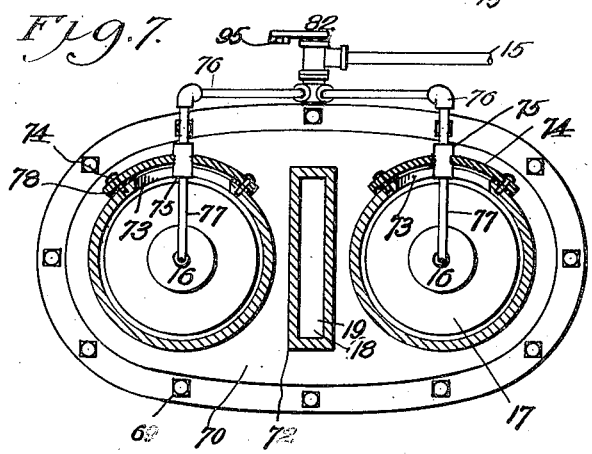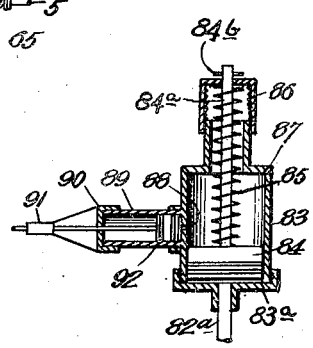

Patented Aug. 4, 1936

2,049,652

UNITED STATES PATENT OFFICE 2,049,652

STEAM POWER PLANT GENERATOR

Sidney W. Jolley, Osawatomie, Kans.

Application November 15, 1934, Serial No. 753,149

13 Claims. (Cl. 122—41)

This invention relates to steam generating plants for stationary and mobile uses, and more especially to steam plants characterized by spray type flash equipment, and the object, broadly stated, is to provide a plant of safe, efficient and relatively economical construction and operation.

With this object in view, the invention consists in certain novel and useful features of construction and organization of parts as hereinafter described and claimed; and in order that it may be fully understood, reference is to be had to the accompanying drawings, in which:—

Figure 1 is a diagrammatic view of a steam generating plant embodying the invention.

Figure 2 is a vertical section of the water receiver and the water and fuel tanks.

Figure 3 is a top plan view of the plant elements disclosed by Figure 2.

Figure 4 is a plan view of one of the water sprayers, with the cap plate omitted.

Figure 5 is a vertical section of one of the water sprayers.

Figure 6 is an elevational side view partly in section and with the dome broken to disclose the duplex valve for the automatic control of the flow of water from the receiver to the steam generating element of the plant.

Figure 7 is a horizontal section on the line VII—VII of Figure 6.

Figure 8 is a fragmentary vertical section on the line VIII—VIII of Figure 6.

Figure 9 is a vertical section of the duplex valve mechanism.

Referring now to the drawings in detail, and first to the diagrammatic view, 1 indicates a tank for holding liquid fuel, under pressure supplied by a conventional or other suitable air pump 2 or its equivalent. 3 is a valve-controlled fuel discharge pipe having branches 4 and 5, leading respectively to a burner 6 of a water receiver 7, and to burners 8 for supplying heat for the steam generating structure 9.

At the bottom of the water receiver there is a discharge flue or pipe 10, to receive and be heated by the products of combustion from burner 6, to heat water in the receiver to the boiling point or other desired temperature. To control or regulate the volume of fuel passing through branch pipe 4 to burner 6, said branch has a valve 11 for operation through the action of a thermostat 12 influenced by the heat of the wall of the receiver, a pipe 13 leading from the thermostat to a conventional temperature gage 14. By this arrangement, the water in the receiver 7 can be kept at constant temperature and pressure and supplied through a valve-controlled tube 15, to a spray or sprays 16 for spraying the water down upon a plate 17 overlying and heated to vaporizing temperature by the burners 8 for the generation of steam in a chamber 18, below and communicating through flue 19 with the lower part of the steam dome.

The steam dome has a safety pop-off valve 20 and a valve-controlled discharge pipe 21, leading to a steam turbine 22 or its equivalent. Power transmission means, shown as at 23, connect the shaft of the turbine to a suitably journaled shaft 24 equipped with an eccentric 25 for reciprocatory-piston operation of a pump 26, having a water intake port 27 leading from a water supply tank 28 and controlled by a check valve 29, preventing back flow to the tank. The pump also has a discharge pipe 30 leading to the water receiver 7, and provided with a check valve 30a and a control valve 31, and a by-pass or branch pipe 32 leads from pipe 30 to the upper part of the water supply tank, and has a control valve 33. Valves 31 and 33 have lever arms connected pivotally by a link 34, and a link 35 pivotally connects the arms to a lever 36, fulcrumed on one of a set of standards 37 surrounding the receiver, the free end of the lever overlying a plunger 38 of the receiver, the arrangement being such that upward movement of the plunger shall effect closing movement of valve 31 and opening movement of valve 33, the result being to by-pass the water circulated by the pump, from the tank back to the latter. It will be noted in this connection, that the pressure of water pumped into the receiver 7, effects the upward travel therein of the plunger, and that when the desired water pressure is attained in the receiver, the supply of water thereto is cut off as explained, and thus allows the pump to run constantly without danger of overstraining it. To maintain this pressure, and yet supply water in proper volume to the sprays 16, an adjustable pressure plate 39 engages the upper end of a spring 40 seated in the plunger and said plate 39 is abutted by a bolt 41 engaging and projecting through a stop plate 42 connected to and rigid with the standards 37. By means of a wrench applied to its upper end, the bolt may be turned to increase or relax the pressure of plate 39 upon the spring and thus increase or diminish the resistance of the latter to upward movement of piston 38 under pressure applied by the water in the receiver, it being noted that the plunger is equipped with sealing rings 43 and at the upper end of the cylinder there is a packing gland construction 44 to prevent escape of water from the cylinder around the plunger. The cylinder also has an internal flange 44a to limit downward travel of the plunger under gravitative force and the pressure of the spring 40, and the plunger has a slotted lug 45 receiving the upper end of lever 36 to rock the latter and reverse the operation of valves 31 and 32 to recharge the receiver with water by the time the downward movement of the plunger has forced a substantial volume of the previous charge to the sprays 16, the charging and recharging operations being automatic. The receiver preferably is composed of two superposed sections bolted together at 46. The lower section has a bottom 47 upon which the flame from burner 6 impinges, and a drain-cock 48. It also has a depending circular flange 49 around which is fitted and secured the upper end of a housing 50 containing burner 6 and provided with perforations for the admission of air to support combustion. Sufficient heat from the lower section of the receiver effects operation of the thermostat 12 to operate the valve 11 controlling pipe 4 between hand-valve 51 and burner 6. The mechanism shown to effect operation of the automatic valve comprises a bell-crank 52 bracketed to the receiver, a rod 53 to transmit movement from the thermostat to the bell-crank, and a link 54 pivotally connecting the bell-crank to the handle of said valve 11. The temperature of the receiver will be ascertained by reference to the gage 14 and the pressure at which the water is fed to the receiver will be indicated by a gage 55 connected to the water supply line 30 at a point adjacent to the receiver.

The water-supply tank contains a float 56 of a lever 57 connected to a link 58 for the operation of any conventional indicator or gage (not shown), so that replenishment of the water may be made when necessary, and the tank is equipped with a filling tube 59 such as used on a motor car radiator or of any other suitable type.

Referring now to the detail construction of the steam generator, and to the dome construction and equipment, 60 is a pan or housing for the burners 8, and is secured to a flange 61 depending from plate 17. It has a bracket support 62 for a bell-crank 63, linked at 64 to the handle of a valve 65 controlling fuel pipe 5, the latter also having a hand-operated valve 66 between the valves 51 and 65, and a similar valve 67 between burners 8 and automatic valve 65. The pan or housing 60 has perforations for admission of air and a discharge or exhaust pipe or flue 68 for the products of combustion.

The plate 17 is preferably of elliptic form (see Figure 7), and secured upon it with a steam tight connection by the bolts 69 is the correspondingly contoured arched base 70 of the dome, the base being connected to the dome by a pair of spaced hollow vertical columns 71 open at the bottom and closed at the top by the bottom of the dome, and between the columns is a preferably rectangular tube 72, providing the port 19 which communicates with the dome and with the steam-generating chamber 18 formed by the plate 17, the base 70, the columns and the port-forming tube, and containing the sprays 16.

Each column 71 has an opening 73 of area sufficient to admit or give easy access to the sprays, which openings may be in the sides of the column as shown, or at points more accessible from the ends of the dome. The said openings are closed by removable cover plate 74 provided with through tube 75 for the attachment of branch tube 76 of pipe 15, and extensions 77 for said branches for supporting and supplying the sprays 16. Gaskets 78 of fire and steam proof material are interposed between the columns and cover plates—it being understood also that all joints of the plant or system, subjected to flame, heat, steam or water will be protected by gaskets.

The steam dome is closed at one end as common, by a removable head, and will have the conventional steam gage, and the steam discharge pipe 21 is controlled by a hand-valve 79. To disclose and control temperature conditions of the generator, the plate 17 carries a thermostat 81 connected by a rod 81a to bell-crank 63, and there is a gauge 81b disposed to indicate the temperature of the plate 17.

To provide for automatically operating valve 82 controlling pipes 76 for cutting off water to the sprays and thus avoid excessive steam pressure in the dome, without depending on the pop-off relief valve 20, a duplex valve is employed and is constructed as follows: Referring particularly to Figure 9, 82a is a pipe leading from the dome into a cylinder 83, having a removable head 83a for the assembly of a piston hereinafter mentioned. Mounted to reciprocate in the cylinder 83 is a piston 84 provided with suitable piston rings. Encircling the stem 84a of the piston is a spring 85 pressing at one end against the piston and at its other end against a threaded cap 86 on the cylinder 83. By screwing the cap back and forth the tension of the spring on the piston 84 may be adjusted as desired, to oppose upward movement of the piston by steam pressure from pipe 82a. Back pressure on the piston is avoided by vent holes 87. The piston stem may also carry a cross pin 84b to prevent undue projection of the piston under the force of the spring when the parts are dismantled. Midway the length of the cylinder it has a small lateral port 88 communicating with a small cylinder 89 screwed into the wall of cylinder 83, and closed at its outer end by a removable cap 90 having an offset guide 91 for the sleeve of a piston 92 provided with piston rings.

The outer end of the stem of piston 92 is pivotally connected to one arm of a bell-crank 93 fulcrumed on a bracket 94 secured to the dome. The other arm of the bell crank is pivotally connected by a link 95 with the handle of valve 82, and a retractile spring 96 connects the last-named arm of the bell-crank with the bracket 94. When the pressure of steam in cylinder 83 effects sufficient upward travel of piston 84 to expose port 88, the steam enters cylinder 89 and forces the piston 92 outward. This rocks the bell-crank 93 against the resistance of spring 96 and effects the closing of valve 82 and thereby shuts off the supply of hot water to the sprays. As the pressure in the dome and cylinder 83 falls, the piston 84 is forced downward and when it has attained a position below the lateral port 88, the steam in cylinder 89 escapes back into cylinder 83 and through the vents, this removal of pressure from piston 92, permitting reaction of spring 96, to force piston 92 inward and reopen the valve 82.

Any suitable sprays may be employed, but it is preferred to employ the type of spray shown in detail by Figures 4 and 5. In said figures, 97 is a hollow cylinder open at the top and provided at the bottom with a central opening 98 surrounded by a set of jet orifices 99. The cylinder is interiorly threaded at 100 from the bottom nearly to the top, and above the threads 100 the bore is slightly enlarged but also threaded as at 101 for engagement by a threaded closure cap 102. A bolt having reversed threads 103 and 104, extends slidingly through opening 98, and has end portions 105 shaped for engagement by a socket or other suitable wrench. A disk 106 within the cylinder and engaging threads 104 of the bolt, fits closely adjacent the bottom of the cylinder, and a lock nut 107 on the bolt, bears upon said disk, thus making the latter stationary with respect to the bolt. A second disk 108 loosely surrounds the bolt and has a recess 109 receiving the lock-nut 107, and said disk 108, is threaded to the cylinder, there being a slight clearance between said disks. A lock ring 110 threaded on the cylinder, closely overlies the disk 108, and surrounds a third disk 111 threaded on the bolt and closely adjacent disk 108, and mounted on the bolt and engaging disk 111 is a lock nut 112, a similar locking nut 113 on bolt threads 103, being disposed at the underside of the bottom of cylinder 97.

The three disks 106, 108 and 110, having series of perforations 114, 115, and 116 respectively, corresponding in number to the cylinder perforations 99, and when the spray is to be operated to full capacity, the disk perforations are brought into full register or alinement with the perforations of the cylinder. After assembling of the parts of the spray lying below disk 111, a pin (not shown) is fitted up through one of the perforations of the cylinder and alined perforations of disk 106 and 108, and then the lock ring is screwed down in clamping engagement with disk 108 to lock the same against turning movement. Disk 111 is then run down on the bolt until close to disk 108, and then the pin mentioned is pushed up through a perforation of disk 111 and lock nut 112 is run down to secure disk 111 in fixed relation to the bolt. As thus arranged disk 108 is fixed with relation to the cylinder and disks 106 and 111 are fixed with relation to the bolt, full registration of the series of perforations being attained, lock-nut 113 is adjusted to firmly abut the underside of the bottom of the cylinder and the pin mentioned is withdrawn. The adjustment of the lock-nut 113, draws the bolt downward slightly and establishes tight-joints between disk 106, and the cylinder bottom and between disks 108 and 111 to prevent accidental disarrangement. To establish partial registration between the series of perforations, lock-nut 113 is loosened to permit the bolt to be turned to the required extent, and then the said lock-nut is brought back to clamping engagement with the cylinder. The spray jet openings will be kept clean by pressure of the hot water, but when a thorough cleaning operation is necessary, the cap 102 can be removed. The various burners will, of course, have pilot light attachments of any suitable type, not shown, for instantly igniting the liquid fuel when the latter issues from the burners under pressure from the fuel tank.

Operation

Before starting the plant in operation, assuming that it has been drained and allowed to cool and that the water supply and fuel supply and pressure is adequate, the operator closes valve 118 controlling communication between the receiver and sprays, and closes hand-valves 51 and 67 for supplying the burners with fuel. He then, by means of a hand pump, not shown, or by hand driving of the turbine operates the pump shown to force water into the receiver until the lower section thereof is about fully charged. On a plant for automobiles, the starter mechanism may be used to effect operation of the turbine, and for small plants, resort may be had to hand-filling of the receiver, provided the latter has a suitable valve-controlled filling tube as shown at 117.

The thermostat-controlled valves being open, the operator opens the fuel control valves 51 and 66 and 67 and the fuel issuing from the burners is ignited by the pilot flames. When the water in the receiver has attained the required temperature, about boiling point, the hand valve 118 is opened, it being understood that the automatically-operated valve 82 is standing open at this time. As the water is sprayed down upon the heated plate 17, it flashes or is converted into steam, which by way of port 19, enters the dome. As the pressure of steam in the dome attains the required degree, valve 79 is opened to effect operation of the turbine and the connected pump, the latter supplying water in sufficient volume and at sufficient pressure to not only compensate for that passing to the sprays but to gradually rise in the receiver and effect the raising of the plunger 36 until it, through lever 36, effects closure of feed valve 31 and the opening of valve 33 to by-pass the water back to the water supply tank, it being also true that when the temperature of the water in the receiver attains the boiling point or other predetermined degree, the thermostat 12 will close fuel valve 11 leading to burner 6, and reopen said valve when the temperature falls to normal. The same action occurs with respect to the fuel for burners 8, as a similar thermostat responding to the temperature of plate 17, effects closure of valve 65, and thus guards against excessive generation of steam. However, should the steam pressure of the dome get too high, perhaps through failure of the thermostat, the duplex valve will operate as hereinbefore described, to close valve 82. In reserve there is the pop-off valve to relieve the pressure if dangerously high.

From the above description it will be apparent that while I have described what now appears to be the preferred embodiment of the invention, it is to be understood that I reserve the right to make all changes within the spirit of the invention and without the ambit of the prior art.

I claim:

1. In a steam generating plant, a water tank, a water receiving reservoir, a flash type steam generating chamber and a dome communicating therewith, a pump, means actuated by steam from the dome for operating the pump, a pipe line leading from the tank to the receiving reservoir and thence to the generating chamber and connected to the pump, a valve in said pipe line between the receiving reservoir and the steam generating chamber, a by-pass line leading to the tank from the first-named pipe line between the said receiving reservoir and the pump, a normally-closed valve in the by-pass line, and yielding means actuated by predetermined volume of water under pressure in the receiving reservoir, to effect the opening of the valve in the by-pass line, and upon the lowering of the said water level to reverse the operation of said valve.

2. In a steam generating plant, a water tank, a water receiving reservoir, a flash type steam generating chamber and a dome communicating therewith, a pump, means actuated by steam from the dome for operating the pump, a pipe line leading from the tank to the receiving reservoir and thence to the generating chamber and connected to the pump, a valve controlling the flow of water from the receiving reservoir to the steam generating chamber, a by-pass line leading to the tank from the first-named pipe line between the said receiving reservoir and the pump, a normally-closed valve in the by-pass line, yielding means actuated by predetermined volume of water under pressure in the receiving reservoir, to effect the opening of the valve in the by-pass line, and upon the lowering of said predetermined water pressure to reverse the operation of said valve, means to heat the water in the receiving reservoir to a temperature limited by the resistance offered by the said yielding means to less than steam-generating temperature, means to heat the generating chamber to flash type producing temperature, and means to effect cessation of the heating action of the means for heating the receiving reservoir when the predetermined temperature thereof is attained and to restore said heating means to activity when said temperature falls.

3. In a steam generating plant, a water tank, a water receiving reservoir, a steam generating chamber, and a dome communicating therewith, a pump, means actuated by steam from the dome for operating the pump, a pipe line leading from the tank to the receiving reservoir and thence to the generating chamber and connected to the pump, a manually operative valve on the pipe line between said reservoir and generating chamber reservoir, a by-pass line leading to the tank from the first-named pipe line between the said receiving reservoir and the pump, a normally-closed valve in the by-pass line, yielding means actuated by predetermined pressure of water in the receiving reservoir, to effect the opening of the valve in the by-pass line valve, and upon the lowering of said predetermined pressure to reverse the operation of said valve, a valve controlling the access of water from the pipe line to the generating chamber at a point between the latter and the manually operative valve, a duplex valve mechanism in communication with the steam dome, operable connections between the duplex valve mechanism and the valve controlling access of water to the generating chamber, whereby steam pressure above a predetermined degree, shall cause the duplex valve to effect the closure of the other valve, and yielding means to oppose the closing of the water access valve and to reopen the same when the steam pressure falls below the said predetermined degree.

4. In a steam generating plant, a steam generating chamber and a dome communicating therewith, water sprayers in said chamber, a water-supply line leading to the sprayers, a valve controlling said water-supply line, means to heat the generating chamber to steam-producing temperature, a duplex valve mechanism comprising a main cylinder in communication with the steam dome, and provided with a vent, an auxiliary cylinder communicating with the main cylinder between the steam-receiving and venting points of the latter, a piston in the main cylinder, a spring tending to hold the piston between the points of communication with the main cylinder of the steam supply from the dome and the auxiliary cylinder, a piston in the latter, and means whereby the repression of the piston of the auxiliary cylinder by steam entering same after forcing the piston of the main cylinder back until communication between the dome and auxiliary cylinder is established, shall effect closure of said water-control valve.

5. In a steam generating plant, a steam generating chamber and a dome communicating therewith, water sprayers in said chamber, a water-supply line leading to the sprayers, a valve controlling said water-supply line, means to heat the generating chamber to steam-producing temperature, a duplex valve mechanism comprising a main cylinder in communication with the steam dome, and provided with a vent, an auxiliary cylinder communicating with the main cylinder between the steam-receiving and venting points of the latter, a piston in the main cylinder, a spring tending to hold the piston between the points of communication with the main cylinder of the steam supply from the dome and the auxiliary cylinder, a piston in the latter, means whereby the repression of the piston of the auxiliary cylinder by steam entering same after forcing the piston of the main cylinder back until communication between the dome and auxiliary cylinder is established, shall effect closure of said water-control valve, and a spring for effecting readvance of the piston of the auxiliary cylinder and the reopening of the valve, when the pressure of steam in the dome falls enough to permit the spring in the main cylinder to force the piston thereof to a position where it closes communication between the dome and auxiliary cylinder and opens communication between the latter and the said vent of the main cylinder.

6. In a steam generating plant, a generating chamber, and a communicating steam dome, means to raise the chamber to steam generating temperature, a pipe line for water under pressure, a valve in said line, water sprayers within the generating chamber, means to heat the water from the water-supply line before the former reaches the sprayers, a receiving reservoir for water from the pipe line, at an intermediate point of the latter relative to the said valve and said water sprayers, means to yieldingly resist the rise of water in the receiving reservoir beyond a predetermined level, and means actuated by the first-named means under a predetermined accumulation of water in the receiving reservoir beyond said predetermined level, to close the valve in the water supply line, and to effect full reopening of said valve by the time the yielding means has reacted enough to force said accumulation of water through the sprayers.

7. In a steam generating plant, a generating chamber, and a communicating steam dome, means to raise the chamber to steam generating temperature, a pipe line for water under pressure, a valve in said line, water sprayers within the generating chamber, a receiving reservoir for water from the pipe line at an intermediate point of the latter relative to the said valve and said water sprayers, means to yieldingly resist the rise of water in the receiving reservoir beyond a predetermined level, means actuated by the first-named means under a predetermined accumulation of water in the receiving reservoir beyond said predetermined level, to close the valve in the water supply line, and to effect full reopening of said valve by the time the yielding means has reacted enough to force said accumulation of water through the sprayers.

8. In a steam generating plant, a generating chamber, and a communicating steam dome, means to raise the chamber to steam generating temperature, a pipe line for water under pressure, a valve in said line, water sprayers within the generating chamber, a receiving reservoir for water from the pipe line, at an intermediate point of the latter relative to the said valve and said water sprayers, means to yieldingly resist the rise of water in the receiving reservoir beyond a predetermined level, means actuated by the first-named means under a predetermined accumulation of water in the receiving reservoir beyond said predetermined level, to close the valve in the water supply line, and to effect full reopening of said valve by the time the yielding means has reacted enough to force said accumulation of water through the sprayers, a burner to heat the water in the receiving reservoir, and means to cause cessation of operation of the burner when the water in the receiving reservoir has attained a predetermined temperature and to restore the burner to operation when the temperature of the water falls below the predetermined degree.

9. In a steam generating plant, the combination of a supply tank for water, a pump mechanism having an intake, from the tank, a valve-controlled discharge pipe for the tank and a valve-controlled by-pass to cut off water discharged from the pump and return it to the tank, a water receiving reservoir connected to the said discharge line of the pump beyond the control valve thereof, a plunger to yieldingly resist the pressure of water at or above a predetermined water level in the receiving reservoir, and means actuated by the plunger when fully repressed by the water to close the valve of the pump discharge line to shut off further supply of water to the receiving reservoir, and open the valve of the by-pass line and actuated by full reserve operation of the plunger to reverse the operations of said valves.

10. In a steam generating plant, the combination of a supply tank for water, a pump mechanism having an intake from the tank, a valve-controlled discharge pipe for the tank, and a valve-controlled by-pass to cut off water discharged from the pump and return it to the tank, a water receiving reservoir connected to the said discharge line of the pump beyond the control valve thereof, a plunger to yieldingly resist the pressure of water at or above a predetermined water level in the receiving reservoir, means actuated by the plunger when fully repressed by the water to close the valve of the pump discharge line to shut off further supply of water to the receiving reservoir, and open the valve of the by-pass line and actuated by full reserve operation of the plunger to reverse the operations of said valves, a burner to heat the receiving reservoir, and means actuated by a predetermined temperature of the receiving reservoir, for causing cessation of operation of the burner, and for restoring the burner to action when the temperature falls below the predetermined degree.

11. The combination of a flash-type steam generator, a water-supply tank, a water-receiving reservoir connected to the tank, a water-discharge pipe leading from the reservoir to the generator, a manually operated valve controlling the discharge pipe, means to charge the reservoir with water under pressure from the tank, and yielding-means actuated by water supplied in certain volume to the reservoir by the charging means to by-pass water back to the tank, and at the same time force water from the reservoir to the generator.

12. The combination with a flash-type steam generator, of a hot water reservoir, a pipe line leading from the reservoir to the generator, a yielding means for forcing water from the reservoir to the generator and means actuated by the yielding means in performing its water-expelling function, to effect replenishment of the reservoir with water under sufficient pressure to repress the yielding means without interrupting the discharge of water from the reservoir.

13. The combination with a flash-type steam generator, of a hot water reservoir, a pipe line leading from the reservoir to the generator, yielding means tending to force water under constant pressure, from the reservoir through the pipe line, a valve controlling the flow of water from the pipe line to the generator chamber, valve-opening yielding means, and means actuated by excess steam pressure to overcome the last-named yielding means and impart closing movement to the valve to cut off access of water to the generator without relaxing the pressure imposed on the water in the reservoir by the first-named yielding means.

SIDNEY W. JOLLEY.